Dec. 4, 1934. A. A. CLAASSEN Re. 19,388

CHECKERWORK

Original Filed Dec. 26, 1930 2 Sheets-Sheet 1

Witness:
L. B. Graham

Inventor:
A. A. Claassen
By J. M. Roberts
his Att'y

Dec. 4, 1934. A. A. CLAASSEN Re. 19,388
CHECKERWORK
Original Filed Dec. 26, 1930 2 Sheets-Sheet 2
Fig. 4
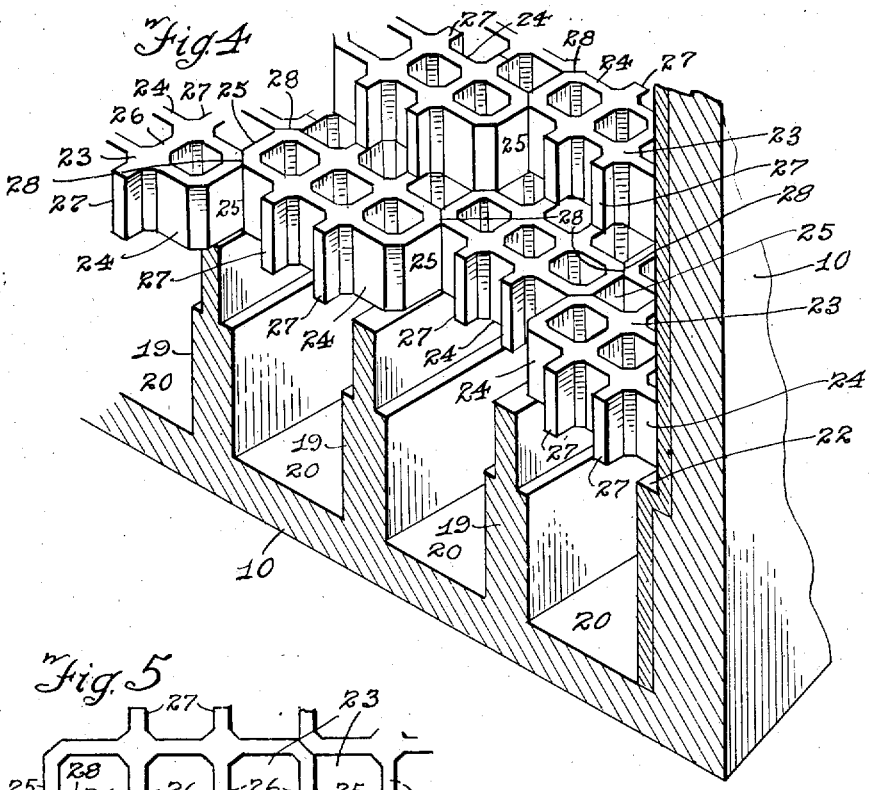
Fig. 5
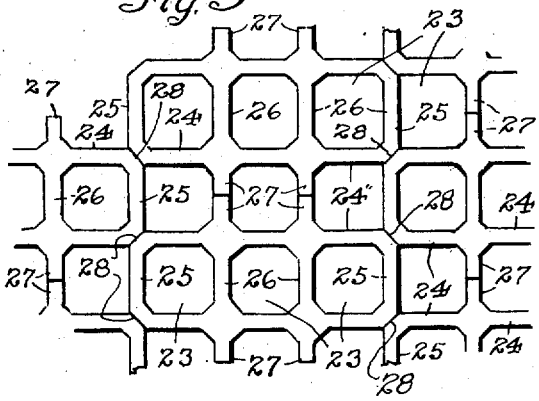
Fig. 7
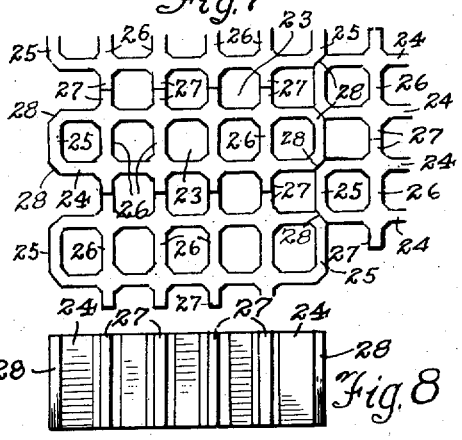
Fig. 6
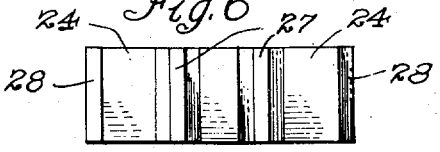
Fig. 8
Witness:
L. B. Graham
Inventor:
A. A. Claassen
By J. M. Roberts
his Att'y.

Reissued Dec. 4, 1934

Re. 19,388

UNITED STATES PATENT OFFICE 19,388

CHECKERWORK

Alvin A. Claassen, Chicago, Ill.

Original No. 1,848,242, dated March 8, 1932, Serial No. 504,696, December 26, 1930. Application for reissue March 6, 1934, Serial No. 714,352

14 Claims. (Cl. 263—19)

My invention relates to improvements in the construction of the checker work for regenerators, and also in the tiles forming the brickwork thereof, used for pre-heating the air supply to furnaces, and particularly to open hearth furnaces. Its object is to provide checker work which affords improved constructions and highly efficient operative conditions with respect to several of the factors by which the effectiveness of regenerators is governed, and it consists in the matters hereinafter disclosed and set forth in the appended claims. In the annexed drawings disclosing the several features of my invention in practical embodiments thereof, Figure 1 is a longitudinal view in vertical section showing a multiple-pass vertical regenerator in which the checker work is constructed according to my invention;

Figure 4 is a perspective view showing a number of my improved tiles assembled to illustrate the manner in which they are laid in the chamber and their structural relations therein;

Figure 5 is a detail view of a number of the tiles shown in Figure 2 assembled to show the staggered order in which they are arranged in the checkers;

Figure 6 is a side view of one of the tiles of Figure 5;

Figure 7 is a detail view of a number of tiles shown in Figure 3 assembled to show the staggered order in which they are arranged in the checkers, and Figure 8 is a side view of one of the tiles of Figure 7.

Figure 1:
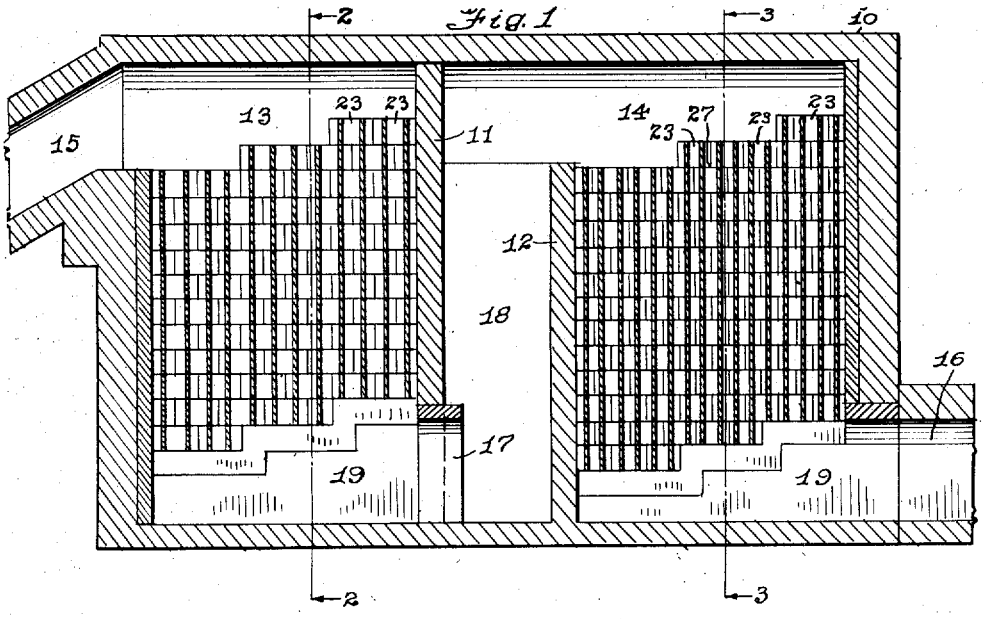
Figure 2:
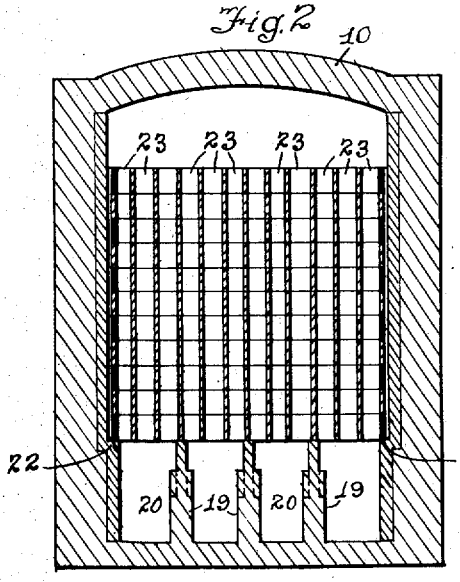
Figure 2 is a vertical cross-sectional view of one pass on the line 2—2 in Figure 1.
Figure 3:
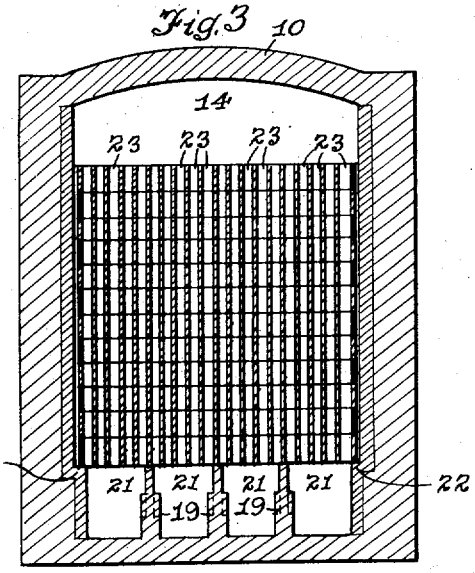
Figure 3 is a similar view of another pass on the line 3—3 in Figure 1.

In the drawings the same reference numerals indicate the same or similar parts in the several figures, and the numeral 10 indicates a suitable regenerator chamber lined with fire-brick and divided longitudinally by a median pair of spaced cross-walls 11 and 12 into two passes indicated generally at 13 and 14, and respectively called herein for convenience of designation the first pass and the second pass. The chamber is provided at the upper end of the first pass with a suitable port 15 communicating with the associated furnace, and at the lower end of the second pass with a port 16 which may be alternately connected by well-known means with an outlet for the escape of the waste products of combustion from the furnace and with the source of supply of air or air and gas if gas is used as a fuel in the furnace. The wall 11 is formed with a port 17 at its lower end communicating with the bottom of the first pass, and the wall 12 terminates short of the top at the chamber; these walls provide a vertical passage 18 which extends across the chamber between the passes and communicates at its lower end through the port 17 with the lower portion of the first pass and opens at its upper end into the top of the second pass. The bottom of the chamber is provided in each pass with a series of parallel and laterally spaced rider walls 19 extending longitudinally thereof and providing supports for the checkers and forming with the chamber's side walls a series of longitudinal open-top passages below the checkers for the outgoing waste gases and the incoming air blast as shown in Figures 2 and 3; the passages 20 in the first pass register with the port 17 to communicate with the passage 18, and the passages 21 in the second pass register with the port 16. The rider-walls 19 preferably are constructed in step-formation rising in the first pass from its furnace end toward the port 17 and in the second pass from the wall 12 toward the port 16, as shown for example in Figure 1, it being understood that the number of such steps and the height of their risers may be varied according to the conformation of the checker elements employed. The linings of the side walls of the chamber 10 are formed with horizontal seats 22 arranged in step-formation conforming with the treads of the rider-walls 19 to carry the outer ends of the tiles in their vertical side rows.

The checkers are vertical and each is composed of multiple closed-flue tiles indicated in general at 23, which are substantially rectangular in outline or contour in plan view and are formed of suitable refractory material. Each tile consists of side walls 24, end walls 25, transverse internal partitions 26 dividing the length of the interior area of the tile into cells of substantially the same size, and external lateral fins 27, all moulded or cast as a unit, the side walls being preferably longer than the end walls, and the walls, partitions and fins being of substantially the same size in cross-section. Each tile thus has a plurality of vertical cored cells or flue-openings in its length formed by its walls and transverse partitions. In any given tile the cells are uniform in contour and in cross-sectional area or size according to the desired size of the flues to be employed in their intended pass, and they may be made in any multiple of such flue size; three such cells are formed in the tiles shown in Figures 4 and 5 for flues of a relatively large size which may be desired in the checker work in a particular pass (for example in the first pass here shown), and five such cells are formed in the tiles shown in Figure 7 for flues of lesser size which may be desired in the checker work in another pass (for example in the second pass here shown). The size of the cells may be varied in tiles of different or substantially the same lengths; for example, in the tile shown in Figure 5 they may be about eight and one-half (8½) inches square, and in the tile shown in Figure 7 they may be about five (5) inches square. In each tile its integral lateral fins or projections 27 on each side are in extension and alignment with its partitions 26, and each fin in length is approximately one-half of the cell-width or partition length, so that when tiles having cells of the same size or pattern are laid side by side their fins align and divide the space between the sides of adjacent tiles into cells corresponding in size and contour with the cells in the tiles themselves, as shown in Figures 5 and 7. In practice, the fins may be of such length that those facing each other on adjacent tiles abut when the tiles are stacked, or the fins may be shorter and form a slight gap between their facing ends; this latter construction has its advantages as it affords a margin of tolerance that may be desired in casting the tiles owing to the character of their material, and the gaps (in width preferably about one-half of the thickness of the fins) in effect give additional exposed surfaces for heat exchange. The fins extend the overall width of each tile to twice the size of its cells or flues plus the thickness of its side walls and give it a wide bearing and lateral stability. The corner fillets add to the strengh of the parts and extend the compression bearing surfaces. In length and width the tiles may be of any size desired and they can be of any suitable depth of flue or cell; their proportions preferably are such as to form flat rectangular bodies having extended longitudinal and transverse bearing surfaces and capable of being readily handled and laid up by bricklayers, and a practical proportion comprises a length of about two (2) feet and ten (10) inches, a depth of about twelve (12) inches, and an overall width (including the fins) of about twenty-one (21) inches in the pattern shown in Figure 5 and about thirteen (13) inches in the pattern shown in Figure 7. The corners are chamfered as shown at 28 so that in the checkers they abut diagonally and afford extended bearings between the corners of adjacent tiles offset in the same course or layer.

The tiles are laid up in horizontal courses with their lengths transverse of the pass, and the supports provided by the rider-walls 19 and seats 22 have such lateral spacing that each end of each tile is directly above a support, as shown in Figures 2, 3 and 4. The alternate tiles in each longitudinal and transverse row in each layer are omitted as shown in Figures 4, 5 and 7; that is, each tile is staggered or offset one tile length (less about one wall thickness) with respect to all adjacent tiles in the same layer and one flue length (less about one wall thickness) with respect to any adjacent tile in the layer above or below it. The resulting spaces between the sides of adjacent or opposite tiles are automatically formed into cells or flues of the same dimensions and contour as those in the tiles themselves by their aligned fins and by the ends of the adjacent staggered tiles in the next rows. Thus each row in the checkers consists of alternate unitary or preformed tile structures and built-up tile structures, and consequently for a given flue size in the checkers only one shape or pattern of tile is required to make a complete checker work in its chamber, and for any given area of chamber the actual number of preformed tiles necessary is reduced one half; the cells automatically formed in the built-up structures in the spaces between the sides of adjacent pre-formed tiles by their fins as above described make the presence of other pre-formed tiles unnecessary. The relation between the tiles and their supports is such that the two ends of each tile in the lowest course rest directly and fully on the supports, and the two ends of each tile in each of the upper courses rest upon and have their load carried through the ends of the other tiles below it as a direct vertical column load to the supports; the tiles in every layer thus have a direct column type of support for both ends, and each tile end has a bearing area of its full width and length. This direct vertical loading of the tiles puts the material under a compression stress only. The tiles stack up into a series of solid vertical walls of uniform thickness and affording open area or flue space for the passage of the gases, and also in such manner that each tile is cross-bonded to the adjacent tiles both laterally and vertically. The diagonal corners and the projecting fins inter-engage to lock each tile to four other tiles in the same layer. The flue walls and fins of each tile are carried by the walls and fins of four tiles in the layer below and are bonded to four other tiles in the layer above in the same manner. Thus each tile is directly in contact with twelve other tiles, all either supporting, stabilizing or maintaining the required fixed position of the tile and its walls. The described construction of the tiles provides great structural strength in the tiles themselves, stability in the checkers and simple means of inter-locking the tiles so that the correct relation of all tile walls to each other is maintained over long periods under operating conditions. The stability of the checkerwork afforded by the structure of the tiles is important to maintain its refractory element in their proper positions and alignments, and also to reduce their liability to obstruct the flues by breaking or spalling. The reduction of the number of pre-formed tiles for a complete checkerwork would also be obtained if the unitary tiles are laid vertically one on top of another in each row as the fins of the tiles in adjacent rows would automatically form built-up tile structures in the spaces between these rows. The construction of the hollow tiles with bodies of considerable length permits them to make long spans between their supports, and so enables their supports to be spaced wide apart and thus minimize their obstruction to gas flow.

The temperatures required in open-hearth furnaces are only developed through the use of highly pre-heated air, or air and gas if gas is used as a fuel, and the effectiveness of regenerators in delivering highly pre-heated air is governed by a number of factors, among the most important being the total volume of refractory material in the checkerwork, the heat transmission rate, and the amount of exposed checker surface. The total amount of heat the regenerators are capable of storing under given temperatures and operating conditions are determined by the volume of refractory material in the checkerwork. The amount of heat actually transmitted into and out of a given volume of refractories is determined by its heat transmission rate, the amount of its exposed surface, and the reversal period of the alternate flow of the outgoing waste gases and incoming air, which is about fifteen minutes in average open-hearth practice. The heat transmission rate is increased when the velocity of the gases flowing through the checker is increased, and it will be more uniform between cleaning and renewal periods if the flue surface is kept relatively free of dust and slag deposits from the passing combustion products, which act as insulators retarding both absorption and radiation of heat, and also tend to clog the flues against the free flow of both the outgoing gases and the incoming air. The tiles of my invention afford an increased volume of refractory material and enable the walls of the flues to be reduced to the most effective thermal thickness for heat exchange during the customary open-hearth reversal period. The tiles stack up in a checker chamber to form a series of solid vertical walls of uniform thickness and flues of uniform open area for the passage of the gases, and the resulting structure has such strength and stability that the thickness of the walls can be reduced to one and one-quarter (1¼) inches or less. For the usual reversal period in open-hearth practice the refractory volume obtained in a wall of approximately such thickness is sufficient to store the amount of heat which its surface is capable of absorbing into it from the passing combustion products. This ratio of volume to surface prevents any lag in the heat transfer behind the ideal requirement which contemplates an instantaneous change from uniform absorption to uniform transmission and vice versa and obviates the objection that when bricks of customary thickness are used (usually 2½ to 4½ inches thick) the heat absorption becomes a surface action, that is, the inside of the brick can be considered an inert useless core as far as its heat transfer value is concerned; in fact, under certain operating conditions, bricks of customary thickness form much less efficient checkers even with equal surface and heat transmission rates, due to a lag in the transfer of heat. In my invention the multiple flue checker tile is of such design that walls of the most effective thermal thickness are used and the ideal thermal requirements for heat transfer are realized, and the strength and stability obtained by thicker walls are maintained. All of the walls, so far as area of gas is concerned, have a uniform amount of gas to preheat. By decreasing the wall thickness more flues can be obtained in the same space without changing the open flue area, and as each flue has solid walls throughout its height a maximum amount of heat transferring surface is obtained. The straight vertical flues reduces the resistance to a minimum and higher velocities can be maintained with the same draft, and their sides provide a surface upon which dust and slag cannot readily be deposited, thus maintaining the efficiency at a high average between cleanings and renewals.

By using supports of step-formation the ends of the transverse rows of checkers are disposed in corresponding formation, their upper ends being stepped-up from front to rear of the pass, and their lower ends being stepped down from rear to front, with the result that there is less loss of draft than if their respective ends were in the same plane. By this construction the bulk of the incoming column of air or air and gas changes its direction in the chamber on curved paths instead of on angular paths so that the loss of available draft is reduced. Also, the step-formation of the ends of the rows gives more uniform distribution of the out-going column of waste gases and of the incoming column of air through the flues due to the easier changes of direction of their travel, and provides uniform length of gas passage or travel in all the flues in a chamber and thus obtains an approximately equal rate of heat-exchange in the flues.

By my invention I am able to provide checkers having a plurality of vertical passes in which the proportions of wall thickness and flue area can be regulated to provide effective velocity, heat-storage, refractory volume and heat transfer surface for the temperature and cleanliness of the gas passing through each pass. In the exemplification here shown the flues of the first pass are larger and their walls are thicker than those of the second pass, though the tiles used in these passes are similar in construction except in those respects and for the size and number of their cells. In operation an amount of fly ash and other waste products is carried through the first pass by the outgoing gases and the temperature of the gas is higher than that of the ash so that the latter is above its fusion point and in a semi-plastic and sticky condition, and by having relatively larger openings or flues in this pass there is less liability of its depositing on the checkerwork and clogging the flues. Also, as the outgoing column of gases is at reduced temperature and so of reduced volume as it goes through the second pass smaller flues can be used in this pass without appreciably reducing the velocity of the column and the walls can be thinner to maintain the ideal ratio of volume of refractories to their surface. In practice the walls in pass one will be about one and one-quarter (1¼) inches thick, and in pass two about seven-eighths (⅞) of an inch thick. On reversal, the incoming air is heated and expands in volume, and by having larger flues in pass one than in pass two its velocity is approximately the same in both passes. If the flues of both passes were of the same size the velocity of the greatly enlarged volume of incoming air would be lessened in pass one, whereas the relatively larger flues in this pass permit this larger volume of air to travel through this pass without appreciable loss of velocity as it comes from the second pass. By this construction I provide checkers having two vertical passes whose proportions of wall thickness and flue area afford efficient velocity of the gases, heat-storage, wall volume and heat transfer surface.

I claim:

1. A tile for checkerwork composed of a rectangular refractory body having a plurality of vertical cored cells in its length and a lateral fin projecting from each side wall of the body enclosing the cells in alignment with the body portion separating the cells, the combined length of the opposite fins on the tile being substantially equal to the distance across one of said cells.

2. A tile for checkerwork composed of a hollow rectangular refractory body having transverse partitions dividing its hollow portion into a plurality of aligned cells of uniform size and lateral fins projecting from each side wall of the body in alignment with the partitions and of a length approximately equal to one-half of the width of said cells.

3. A tile for checkerwork composed of a rectangular refractory body having a plurality of transverse partitions forming cells of uniform size in its length and lateral fins projecting from each side wall of the body in alignment with its partitions and of a length to form built-up cells of approximately the same size as those in said tile when two of said tiles are arranged opposite each other in the same course in the checkerwork.

4. A tile for checkerwork composed of a hollow rectangular refractory body having transverse partitions dividing its hollow portion into uniform cells and lateral fins projecting from each side of the body in alignment with the partitions and of a length approximately equal to one-half of the width of said cells, said body having chamfered corners, and said cells having filleted corners.

5. A checkerwork composed of a plurality of rows of rectangular tiles of uniform length and having transverse partitions dividing their hollow portions into cells of uniform size and lateral fins projecting from each side of each tile in alignment with its partitions and of a length approximately equal to one-half of the width of its cells, said tiles having chamfered corners, and the tiles of each row being spaced apart approximately one tile length and being staggered wth respect to the tiles in adjacent rows, and supports for the end walls of the tiles.

6. A checkerwork having a series of transverse spaced tile-supports, and a plurality of rows of tiles of uniform length, each tile being composed of a rectangular refractory body having transverse partitions forming a plurality of vertical cored cells of equal size in its length and lateral fins projecting from each side of the body in alignment with its partitions, the corners of said bodies being chamfered, and the tiles being laid in courses so that each tile is staggered with respect to adjacent tiles in the same course and with respect to adjacent tiles in the courses above and below it, and the relation of the tiles and their supports being such that the ends of each tile in the lowest course rest directly on the supports and the ends of each tile in each upper course rest upon the ends of the adjacent tiles below it.

7. A multiple vertical-pass checkerwork in which each pass comprises a plurality of tiles each having a plurality of vertical cored cells, spaced cross-partitions, and fins projecting from its sides in alignment with said partitions, the cells of the tiles in one pass being larger than those in the other pass, and the length of the fins of the tiles in each pass being approximately one-half the width of the cells of the tiles in that pass, and supports for the ends of the tiles stepped-up from front to rear of each pass.

8. A multiple vertical-pass checkerwork in which each pass comprises a plurality of tiles each having a plurality of vertical cored cells, spaced cross-partitions, and fins projecting from its sides in alignment with said partitions, the cells of the tiles in one pass being larger than those in the other pass, and the walls, partitions and fins of the tiles having the larger cells being thicker than the corresponding parts of the tiles of the other pass; and supports for the ends of the tiles stepped-up from front to rear of each pass.

9. A multiple vertical-pass checkerwork in which each pass comprises a plurality of rows of tiles each having a plurality of vertical cored cells, spaced cross-partitions, and fins projecting from its sides in alignment with said partitions, the cells of the tiles in one pass being larger than those in the other pass, and the rows of tiles being in step-formation from front to rear of the pass at their tops and from rear to front at their bottoms.

10. A checkerwork composed of a series of laterally spaced supports extending longitudinally of its chamber, and a plurality of rows of oblong tiles each having transverse partitions dividing its hollow portion into a plurality of aligned cells of uniform size and lateral fins projecting from each side of each tile in alignment with its partitions and of a length approximately equal to one-half of the width of its cells, and the tiles being of uniform length and spanning the supports.

11. A multiple vertical pass checkerwork in which each pass comprises a plurality of tiles each having a plurality of walls defining a flue, the flues of the tiles in one pass being larger than those in the other pass, extensions on said walls, certain of said extensions projecting a distance equal to one-half the width of the flue in that pass and supports for the ends of the tiles stepped-up from front to rear.

12. A regenerator comprising two passes of checkers having vertical flues, the flues of one pass being larger than those of the second pass, and a vertical open passage connecting the bottom of the first pass with the top of the second pass.

13. A regenerator comprising two passages of checkers having vertical flues, each pass having a plurality of tiles, each tile having a plurality of walls defining a flue, the flues of one pass being larger than those of the second pass, and a vertical open passage connecting the bottom of the first pass with the top of the second pass.

14. A regenerator comprising two passes of checkers having vertical flues, each pass having a plurality of tiles, the flues of one pass being larger than those of the second pass, a vertical open passage connecting the bottom of the first pass with the top of the second pass and supports for the ends of the tiles stepped up from front to rear of each pass.

ALVIN A. CLAASSEN.